Sept. 18, 1945.  S. A. DRMIC  2,384,822
GRIPPING OR CUTTING TOOL
Filed April 4, 1944
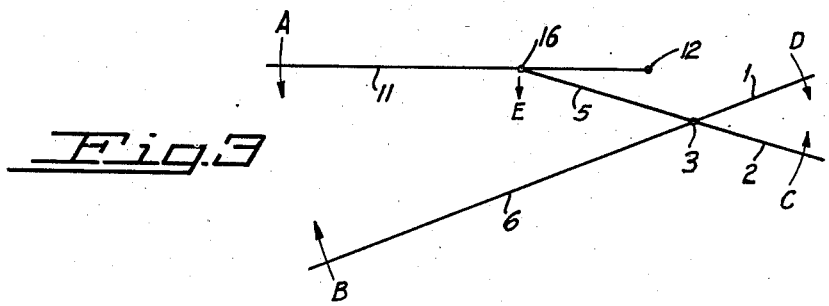
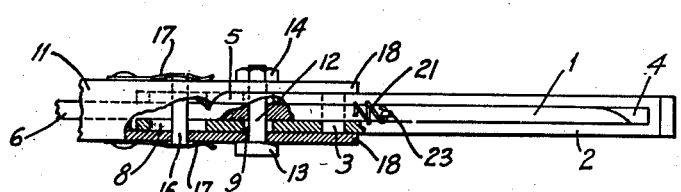
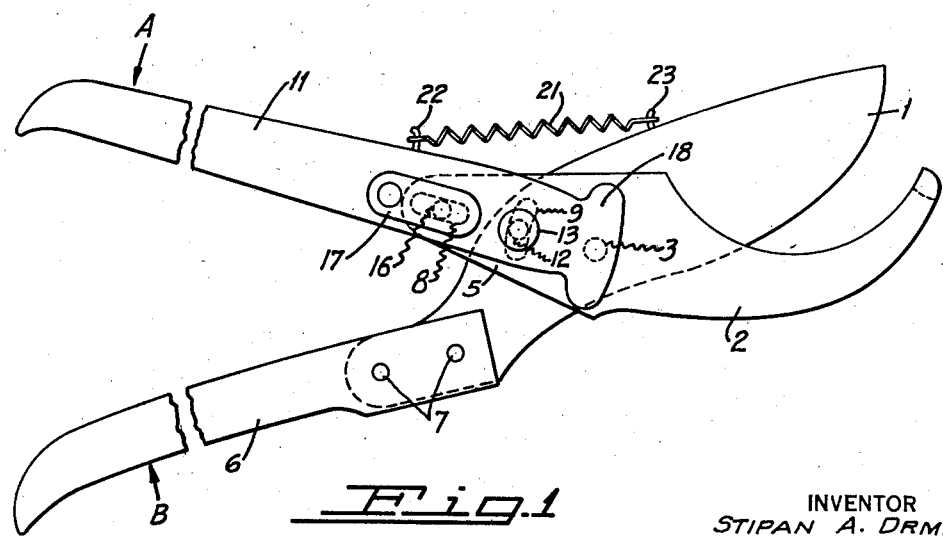
INVENTOR
STIPAN A. DRMIC
BY
Charles S. Evans
HIS ATTORNEY Patented Sept. 18, 1945

2,384,822

UNITED STATES PATENT OFFICE 2,384,822

GRIPPING OR CUTTING TOOL

Stipan A. Drmic, Watsonville, Calif.

Application April 4, 1944, Serial No. 529,521

6 Claims. (Cl. 30—250)

My invention relates to improvements in pruning shears and similar tools having pivotally connected jaws movable to grip or cut an object.

It is among the objects of my invention to provide a tool, such as pruning shears, having jaws operating handles arranged to apply pressure with a high degree of mechanical advantage; and to provide improved means for mounting and retaining pivot pins positioned to obtain compound leverage.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

In the drawing:

Figure 1 is an elevation of a pair of pruning shears embodying my invention, parts of the handles being broken away.

Figure 2 is a plan view of a portion of the shears as shown in Figure 1.

Figure 3 is a diagram illustrating the arrangement of levers, and the application of pressure thereby.

In terms of broad inclusion, the device of my present invention comprises a tool, such as a pair of pruning shears, having a pair of jaws pivoted for movement relative to each other. Handles are connected to the jaws, one of the handles being pivoted upon one jaw and operatively connected to the other for actuating the same by power applied thereto through a compound leverage. My invention also contemplates an arrangement wherein the pivot pin of a pair of pivoted jaws is covered and retained by a handle member pivoted upon one of the jaws at a point spaced from the pivot pin, and connected to the other jaw at a point spaced from the handle pivot.

In terms of greater detail, my invention comprises a pair of jaws 1 and 2 pivotally connected by a pivot pin 3. In the preferred embodiment illustrated in the drawing, the jaw 1 is the cutting blade of a pair of pruning shears; and the jaw 2 is a shearing jaw. Preferably the jaw 2 is slotted, as at 4, to receive the blade 1 as it is moved to cut through an object supported by parallel spaced side portions of the jaw upon opposite sides of the blade 1.

The jaw or blade 1 is provided with a suitable handle 6 rigidly secured thereto by securing means such as rivets 7.

The jaw 2 has an extension 5 projecting rearwardly from the pivot pin 3 across the blade 1. Slots 8 are formed in the parallel side portions of the extension 5 near the rearward end thereof; and arcuate slots 9 are formed in said side portions at points between the slots 8 and the pivot pin 3.

A handle 11 is pivoted to the jaw or blade 1 by a pivot pin 12 which extends through the arcuate slots 9 of the jaw 2. Preferably the pin 12 is provided with a head 13 and is threaded for engagement by a retaining nut 14. A pressure applying pin 16 carried by the handle 11 extends through the slots 8 to permit sliding and pivotal movement of the pin relative to the jaw 2.

The ends of the pin 16 are preferably substantially flush with the outer faces of the handle 11. Spring clips 17, pivoted upon the outer faces of the handle provide a simple and effective means for retaining the pin 16 in its assembled position upon the handle 11 and jaw 2.

The handle 11 is of U-shaped cross section; and is preferably provided with extensions 18 which overlie the ends of the pivot pin 3, and hold the same in its operative position connecting the jaws 1 and 2.

A spring 21 is provided for normally exerting a force tending to spread the jaws 1 and 2 apart. The spring 21 may conveniently be a tension coil mounted by means of hooks or pins 22 and 23 upon the backs of the handle 16 and blade 1 respectively.

In operation, the jaws 1 and 2 are spread and moved to engage an object to be gripped or cut thereby. As squeezing pressure is applied to the handles in the directions indicated by the arrows A and B, the jaws 1 and 2 are moved toward each other as indicated by the arrows C and D. The handle 6 operates as a simple lever fulcrumed upon the pivot pin 3 for applying pressure to the blade 1.

The handle 11 turns about the pivot 12; and the pin 16 is caused to impart pressure in the direction of the arrow E to the rearward extension 5 of the jaw 2, which in turn pivots upon the pin 3. The arcuate slots 9 permit pivotal movement of the jaw 2 over the pivot pin 12 on which the handle 11 moves. The handle 11 itself functions as a simple lever fulcrumed on the pivot 12, and obtaining a mechanical advantage corresponding to the ratio of the lengths between the pivot 12 and the point at which power is applied (for example the arrow A) and the point at which power is delivered (pin 16). The pressure applied by the handle 11 is transmitted to the extension 5, which in turn acts as a lever fulcrumed on the pivot pin 3, and operating with a leverage corresponding to the distance between the pin 16 and the pivot pin 3. Together the handle 11 and the jaw 3 with its rearward extension 5 operate as a compound lever obtaining a mechanical advantage substantially greater than could be obtained by a handle 11 operating as a simple lever about the pivot 3.

While the device of my invention is particularly effective as applied to pruning shears, it is also useful in pliers, tongs, tin snips, and similar devices wherein a pair of pivoted jaws are moved to grip or cut an object.

I claim:

1. A tool comprising a first jaw, a second jaw pivoted to the first jaw and having a slot rearwardly spaced from the pivot axis of the jaws, a handle secured to the first jaw, a second handle, a pivot pin pivotally connecting the second handle to the first jaw through the slot in the second jaw, and a pressure applying pin connecting the second jaw and the second handle at a point rearwardly spaced from the pivot axis of the second handle upon the first jaw and permitting relative pivotal and sliding movement of said second jaw and second handle.

2. A tool comprising a first jaw, a second jaw pivoted to the first jaw and having a slot rearwardly spaced from the pivot axis of the jaws, a handle secured to the first jaw, a second handle, a pivot pin pivotally connecting the second handle to the first jaw through the slot in the second jaw, a pressure applying pin connecting the second jaw and the second handle at a point rearwardly spaced from the pivot axis of the second handle upon the first jaw and permitting relative pivotal and sliding movement of said second jaw and second handle, and means upon the second handle for retaining the pressure applying pin in assembled position.

3. A tool comprising a first jaw, a second jaw, a pivot pin pivotally connecting the jaws, a first handle secured to the first jaw, a second handle pivoted to the first jaw, means connecting the second handle to the second jaw for moving the same relative to the first jaw, and extensions upon the second handle overlying the ends of the pivot pin.

4. A tool comprising a jaw, a handle rigidly secured to the jaw, a second jaw pivoted to the first jaw and provided with a slotted extension projecting rearwardly across the first jaw, a second handle, a pivot pin connecting the second handle and the first jaw through a slot in the extension, and a pressure applying pin connecting the second handle and the second jaw through another slot in the extension.

5. A pruning shears comprising a cutting blade, a shearing jaw pivoted on the blade and provided with a slotted extension projecting rearwardly across the blade, the jaw being provided with side portions spaced to receive the blade therebetween, a handle secured to the blade, a second handle pivoted upon the blade through slots in the jaw extension, means connecting the second handle to the rearward extension of the shearing jaw through other slots rearwardly spaced from the first mentioned slots and permitting relative sliding and pivotal movement of the handle relative to the jaw for actuating said jaw by a compound leverage.

6. A pruning shears comprising a cutting blade provided with a handle portion rigidly connected thereto, a shearing jaw having side portions spaced to receive the blade therebetween, said portions being provided with extensions projecting rearwardly across the blade upon opposite sides thereof and having spaced pairs of slots, a pivot pin connecting the blade and jaw for pivotal movement, a second handle, means pivoting the second handle to the blade through one pair of slots, and a pressure applying pin connecting the second handle to the jaw through another pair of slots.

STIPAN A. DRMIC.